US 12,410,060 B2
Sep. 9, 2025

(12) United States Patent
Strobel et al.

(10) Patent No.: US 12,410,060 B2
(45) Date of Patent: Sep. 9, 2025

(54) BORON-STABILIZED TYPE-I AND TYPE-II CARBON CLATHRATES

(71) Applicant: Carnegie Institution of Washington, Washington, DC (US)

(72) Inventors: Timothy Strobel, Washington, DC (US); Tiange Bi, Washington, DC (US)

(73) Assignee: Carnegie Institution of Washington, Washington, DC (US)

( * ) Notice: Subject to any disclaimer, the term of this patent is extended or adjusted under 35 U.S.C. 154(b) by 0 days.

(21) Appl. No.: 18/778,446

(22) Filed: Jul. 19, 2024

(65) Prior Publication Data

US 2025/0026647 A1    Jan. 23, 2025

Related U.S. Application Data

(60) Provisional application No. 63/527,763, filed on Jul. 19, 2023.

(51) Int. Cl.
*C01B 32/907*    (2017.01)

(52) U.S. Cl.
CPC ........ *C01B 32/907* (2017.08); *C01P 2002/52* (2013.01); *C01P 2002/72* (2013.01); *C01P 2002/76* (2013.01); *C01P 2002/77* (2013.01); *C01P 2006/21* (2013.01); *C01P 2006/40* (2013.01)

(58) Field of Classification Search
CPC .................................................. C01B 35/04
See application file for complete search history.

(56) References Cited

PUBLICATIONS

Powell, H. M. The structure of molecular compounds. Part IV. Clathrate compounds. *Journal of the Chemical Society (Resumed)*, 61-73, (1948).
Momma, K. Clathrate compounds of silica. *J. Phys. Condens. Matter.* 26, 103203, (2014).
Kasper, J. S., Hagenmuller, P., Pouchard, M. & Cros, C. Clathrate structure of silicon $Na_8Si_{46}$ and $Na_xSi_{136}$ (x < 11). *Science* 150, 1713-1714, (1965).
Bobev, S. & Sevov, S. C. Clathrates of Group 14 with Alkali Metals: An Exploration. *J. Solid State Chem.* 153, 92-105, (2000).
Cros, C. & Pouchard, M. Clathrate-type phases of silicon and related elements (C, Ge, Sn). *Comptes Rendus Chimie* 12, 1014-1056, (2009).
Karttunen, A. J., Fässler, T. F., Linnolahti, M. & Pakkanen, T. A. Structural principles of semiconducting group 14 clathrate frameworks. *Inorg. Chem.* 50, 1733-1742, (2011).
Timoshevskii, V., Connetable, D. & Blase, X. Carbon cage-like materials as potential low work function metallic compounds: Case of clathrates. *Appl. Phys. Lett.* 80, 1385-1387, (2002).

(Continued)

*Primary Examiner* — Khanh T Nguyen
(74) *Attorney, Agent, or Firm* — Stein IP, LLC

(57) ABSTRACT

The present invention provides type-I and II carbon-based clathrate compounds stabilized by boron, including a boron-substituted, carbon-based framework with guest atoms encapsulated within the clathrate lattice. In one embodiment, the invention provides a carbon-based type-I clathrate compound of the formula $Ca_8B_xC_{46-x}$.

20 Claims, 11 Drawing Sheets
(11 of 11 Drawing Sheet(s) Filed in Color)

(a) C atoms occupying the 16i (Black,) 24k (Blue,) and 6c (Pink) Wyckoff sites

(56) References Cited

PUBLICATIONS

Connetable, D et al. Superconductivity in doped sp³ semiconductors: The case of the clathrates. *Phys. Rev. Lett.* 91, 247001, (2003).
Blase, X. Quasiparticle band structure and screening in silicon and carbon clathrates. *Phys. Rev. B* 67, 035211, (2003).
Connetable, D. & Blase, X. Electronic and superconducting properties of silicon and carbon clathrates. *Appl. Surf. Sci.* 226, 289-297, (2004).
Blase, X., Gillet, P., San Miguel, A. & Melinon, P. Exceptional ideal strength of carbon clathrates. *Phys. Rev. Lett.* 92, 215505, (2004).
Blase, X., Bustarret, E., Chapelier, C., Klein, T. & Marcenat, C. Superconducting group-IV semiconductors. *Nature Mat.* 8, 375-382, (2009).
Karttunen, A. J., Härkönen, V. J., Linnolahti, M. & Pakkanen, T. A. Mechanical Properties and Low Elastic Anisotropy of Semiconducting Group 14 Clathrate Frameworks. *J. Phys. Chem. C* 115, 19925-19930, (2011).
Cros, C., M., P. & Hagenmuller, P. Sur deux nouvelles phases du système silicium-sodium. *C. R. Acad. Sci.* 260, 4764 (1965).
Nesper, R., Vogel, K. & Blöchl, P. E. Hypothetical carbon modifications derived from zeolite frameworks. *Angew. Chem. Int. Ed.* 32, 701-703, (1993).
San-Miguel, A. & Toulemonde, P. High-pressure properties of group IV dathrates. *High Press. Res.* 25, 159-185, (2005).
Wang, J. T., Chen, C. F., Wang, D. S., Mizuseki, H. & Kawazoe, Y. Phase stability of carbon clathrates at high pressure. *J. Appl. Phys.* 107, 063507, (2010).
Zhao, H. Y., Wang, J., Ma, Q. M. & Liu, Y. From Kelvin problem to Kelvin carbons. *J. Chem. Phys.* 138, 164703, (2013).
Mujica, A., Pickard, C. J. & Needs, R. J. Low-energy tetrahedral polymorphs of carbon, silicon, and germanium. *Phys. Rev. B* 91, 214104, (2015).
Hoffmann, R., Kabanov, A. A., Golov, A. A. & Proserpio, D. M. Homo citans and carbon allotropes: For an ethics of citation. *Angew. Chem. Int. Ed.* 55, 10962-10976, (2016).
O'Keeffe, M., Adams, G. B. & Sankey, O. F. Duals of Frank-Kasper structures as C, Si and Ge clathrates: energetics and structure. *Philos. Mag. Lett.* 78, 21-28, (1998).
Connetable, D. First-principles calculations of carbon clathrates: Comparison to silicon and germanium clathrates. *Phys. Rev. B* 82, 075209, (2010).
Li, Z. H. et al. Superhard superstrong carbon clathrate. *Carbon* 105, 151-155, (2016).
Zipoli, F., Bernasconi, M. & Benedek, G. Electron-phonon coupling in halogen-doped carbon clathrates from first principles. *Phys. Rev. B* 74, 205408, (2006).
Christensen, M., Johnsen, S. & Iversen, B. B. Thermoelectric clathrates of type 1. *Dalton Trans.* 39, 978-992, (2010).
Dolyniuk, J. A., Owens-Baird, B., Wang, J., Zaikina, J. V. & Kovnir, K. Clathrate thermoelectrics. *Mater. Sci. Eng. R Rep.* 108, 1-46, (2016).
Zeng, T. et al. Li-Filled, B-substituted carbon clathrates. *J. Am. Chem. Soc.* 137, 12639-12652, (2015).
Zhu, L. et al. Carbon-boron clathrates as a new class of sp³-bonded framework materials. *Science Advances* 6, eaay8361, (2020).
Strobel, T. A., Zhu, L., Guńka, P. A., Borstad, G. M. & Guerette, M. A Lanthanum-Filled Carbon-Boron Clathrate. *Angew. Chem. Int. Ed.* 60, 2877-2881, (2021).
Zhu, L., Strobel, T. A. & Cohen, R. E. Prediction of an Extended Ferroelectric Clathrate. *Phys. Rev. Lett.* 125, 127601, (2020).
Zhu, L. et al. Superconductivity in $SrB_3C_3$ clathrate. *Phys. Rev. Res.* 5, 013012, (2023).
Rao, R. & Zhu, L. Predicting new heavy fermion materials within carbon-boron clathrate structures. *Phys. Rev. B* 108, 235101, (2023).
Di Cataldo, S., Qulaghasi, S., Bachelet, G. B. & Boeri, L. High-Tc superconductivity in doped boron-carbon clathrates. *Phys. Rev. B* 105, 064516, (2022).
Gai, T.-T et al. Van Hove singularity induced phonon-mediated superconductivity above 77 K in hole-doped $SrB_3C_3$. *Phys. Rev. B* 105, 224514, (2022).
Zhang, P. et al. Path to high-$T_c$ superconductivity via Rb substitution of guest metal atoms in the $SrB_3C_3$ clathrate. *Phys. Rev. B* 105, 094503, (2022).
Geng, N. et al. Conventional High-Temperature Superconductivity in Metallic, Covalently Bonded, Binary-Guest C—B Clathrates. *J. Am. Chem. Soc.* 145, 1696-1706, (2023).
Li, J. et al. High-temperature superconductivity of boron-carbon clathrates at ambient pressure. *Phys. Rev. B* 109, 144509, (2024).
Bi, T., Eggers, B. T., Cohen, R. E., Campbell, B. J. & Strobel, T. Computational Screening and Stabilization of Boron-Substituted Type-I and Type-II Carbon Clathrates. *J. Am. Chem. Soc.* 146, 7985-7997, (2023).
Burdett, J. K., Canadell, E. & Hughbanks, T. Symmetry control of the coloring problem: the electronic structure of $MB_2C_2$ (M=Ca, La, . . . ). *J. Am. Chem. Soc* 108, 3971-3976, (1986).
Haas, C. D. et al. The Color of the Elements: A Combined Experimental and Theoretical Electron Density Study of $ScB_2C_2$. *Angew. Chem. Int. Ed.* 58, 2360-2364, (2019).
Jung, W. et al. $K_7B_7Si_{39}$, a Borosilicide with the Clathrate I Structure, *Angew. Chem. Int. Ed.* 46, 6725-6728, (2007).
Roudebush, J. H., de la Cruz, C., Chakoumakos, B. C. & Kauzlarich, S. M. Neutron Diffraction Study of the Type I Clathrate $Ba_8Al_xSi_{46-x}$: Site Occupancies, Cage Volumes, and the Interaction between the Guest and the Host Framework. *Inorg. Chem.* 51, 1805-1812, (2012).
Bobnar, M. et al. Distribution of Al atoms in the clathrate-I phase $Ba_8Al_zSi_{46-x}$ at x=6.9. *Dalton Trans.* 44, 12680-12687, (2015).
Hübner, J.-M. et al. Cage Adaption by High-Pressure Synthesis: The Clathrate-I Borosilicide $Rb_8B_8Si_{38}$. *Inorg. Chem.* 60, 2160-2167, (2021).
Shevelkov, A. V. & Kovnir, K. in *Zintl Phases: Principles and Recent Developments* (ed Thomas F. Fässler) 97-142 (Springer Berlin Heidelberg, 2011).
Baitinger, M., Böhme, B., Wagner, F. R. & Schwarz, U. Zintl Defects in Intermetallic Clathrates. *Z. Anorg. Allg. Chem.* 646, 1034-1041, (2020).
Hübner, J.-M. et al. A Borosilicide with Clathrate VIII Structure. *J. Am. Chem. Soc.* 144, 13456-13460, (2022).
Tse, J. S. Intrinsic hardness of crystalline solids. *J. Superhard Mater.* 32, 177-191, (2010).
Guo, X. et al. Hardness of covalent compounds: Roles of metallic component and d valence electrons. *J. Appl. Phys.* 104, 023503, (2008).
Gao, F. et al. Hardness of Covalent Crystals. *Phys. Rev. Lett.* 91, 015502, (2003).
Domnich, V., Reynaud, S., Haber, R. A. & Chhowalla, M. Boron Carbide: Structure, Properties, and Stability under Stress. *J. Am. Ceram. Soc.* 94, 3605-3628, (2011).
Knapp, M. & Ruschewitz, U. Structural Phase Transitions in $CaC_2$. *Chem. Eur. J.* 7, 874-880, (2001).
Dewaele, A., Datchi, F., Loubeyre, P. & Mezouar, M. High pressure-high temperature equations of state of neon and diamond. *Phys. Rev. B* 77, 094106, (2008).
Prakapenka, V. B. et al. Advanced flat top laser heating system for high pressure research at GSECARS: application to the melting behavior of germanium. *High Press. Res.* 28, 225-235, (2008).
Meng, Y., Hrubiak, R., Rod, E., Boehler, R. & Shen, G. New developments in laser-heated diamond anvil cell with in situ synchrotron x-ray diffraction at High Pressure Collaborative Access Team. *Rev. Sci. Instrum.* 86, 072201, (2015).
Angel, R. J., Alvaro, M. & Gonzalez-Platas, J. EosFit7c and a Fortran module (library) for equation of state calculations. *Z. Kristallogr. Cryst. Mater.* 229, 405-419, (2014).
Prescher, C. & Prakapenka, V. B. DIOPTAS: a program for reduction of two-dimensional X-ray diffraction data and data exploration. *High Press. Res.* 35, 223-230, (2015).
Toby, B. H. EXPGUI, a graphical user interface for GSAS. *J. Appl. Crystallogr.* 34, 210-213, (2001).
Aslandukov, A., Aslandukov, M., Dubrovinskaia, N. & Dubrovinsky, L. Domain Auto Finder (DAFI) program: the analysis of single-

(56) References Cited

PUBLICATIONS crystal X-ray diffraction data from polycrystalline samples. *J. Appl. Crystallogr.* 55, 1383-1391, (2022).

Sheldrick, G. SHELXT—Integrated space-group and crystal-structure determination. *Acta Cryst. A* 71, 3-8, (2015).

Sheldrick, G. Crystal structure refinement with SHELXL. *Acta Cryst. A* 71, 3-8, (2015).

Farrugia, L. WinGX and ORTEP for Windows: an update. *J. Appl. Crystallogr.* 45, 849-854, (2012).

Blessing, R. H. Data Reduction and Error Analysis for Accurate Single Crystal Diffraction Intensities. *Crystallogr. Rev.* 1, 3-58, (1987).

Blessing, R. Dreadd—data reduction and error analysis for single-crystal diffractometer data. *J. Appl. Crystallogr.* 22, 396-397, (1989).

Perdew, J. P., Burke, K. & Ernzerhof, M. Generalized gradient approximation made simple. *Phys. Rev. Lett.* 77, 3865-3868, (1996).

Perdew, J. P. & Wang, Y. Accurate and simple analytic representation of the electron-gas correlation energy. *Phys. Rev. B* 45, 13244-13249, (1992).

Kresse, G. & Furthmuller, J. Efficient iterative schemes for ab initio total-energy calculations using a plane-wave basis set. *Phys. Rev. B* 54, 11169-11186, (1996).

Blöchl, P. E. projector augmented-wave method *Phys. Rev. B* 50, 17953-17979, (1994).

Togo, A., Oba, F. & Tanaka, I. First-principles calculations of the ferroelastic transition between rutile-type and $CaCl_2$-type $SiO_2$ at high pressures. *Phys. Rev. B* 78, 134106, (2008).

Roundy, D., Krenn, C. R., Cohen, M. L. & Morris, J. W. Ideal Shear Strengths of fcc Aluminum and Copper. *Phys. Rev. Lett.* 82, 2713-2716, (1999).

Timothy A. Strobel et al., "Extending tetrahedral network similarity to carbon: A type-I carbon clathrate stabilized by boron", May 23, 2025, pp. 1-6.

(a) C atoms occupying the 16i (Black,) 24k (Blue,) and 6c (Pink) Wyckoff sites (b) C atoms occupying the 8a (Black,) 32e (Blue,) and 96g (Pink) Wyckoff sites Fig. 2(a)
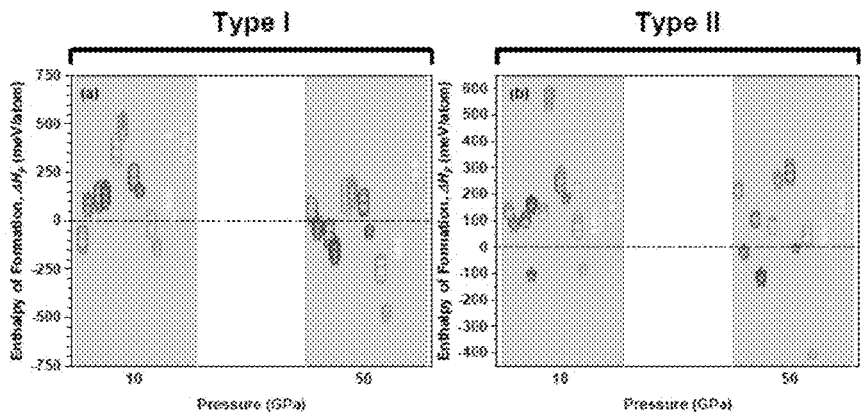
Fig. 2(b)
Fig. 2(c)
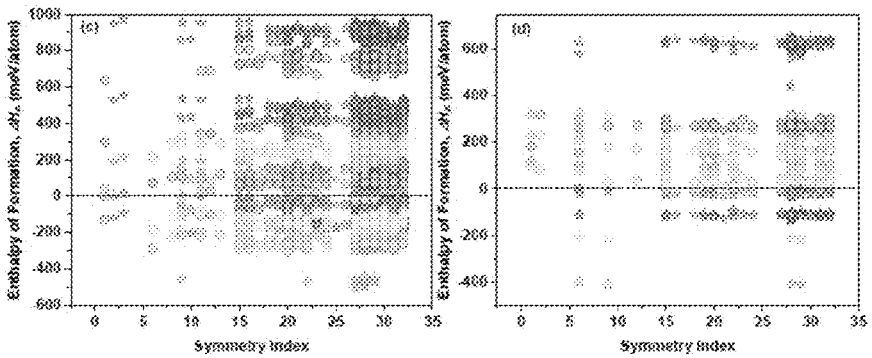
Fig. 2(d)
Fig. 2(e)
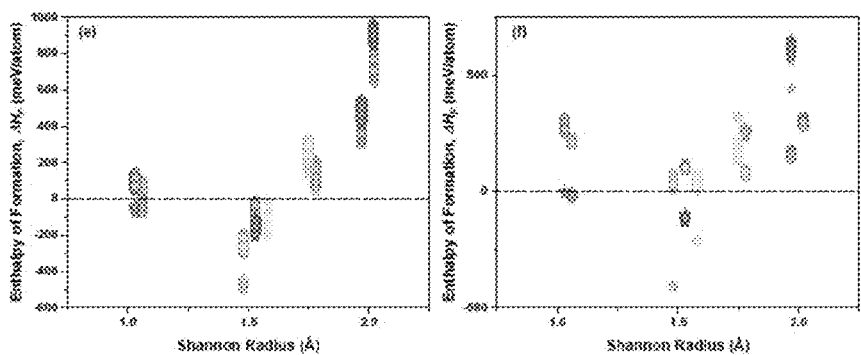
Fig. 2(f)
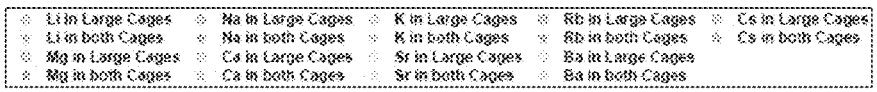

Fig. 3(a)
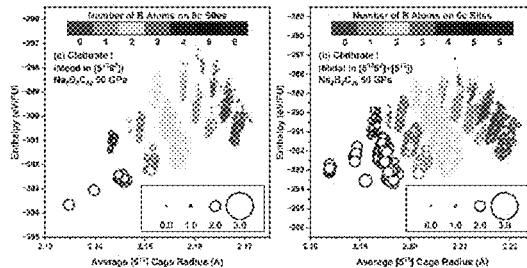
Fig. 3(b)
Fig. 3(c)
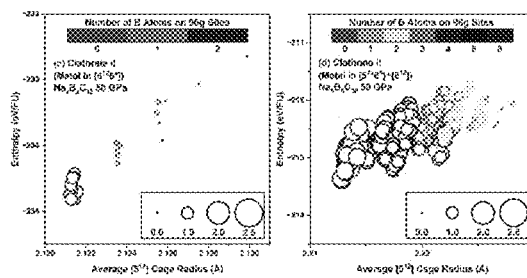
Fig. 3(d)
Fig. 3(e)
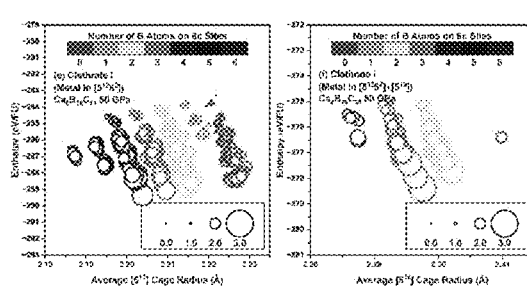
Fig. 3(f)
Fig. 3(g)
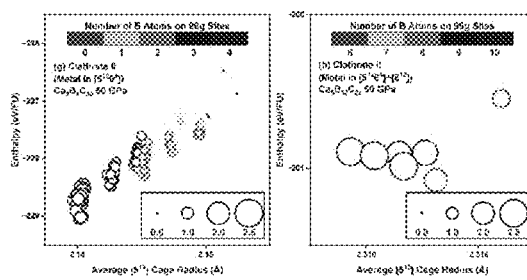
Fig. 3(h)

Black squares: thermodynamically stable phases
Colored circles: metastable phases Atomic positions from MD trajectory after equilibrium:
Ca (green), C (black) and B (pink)

(a) B atoms (pink,) C atoms (black)

Light green: [5¹²6²] cages

Dark green: [5¹²] cages (b) Carbon atoms on the 6c (blue) and 16i (orange)

(c) Boron atoms on the 24k site represented by purple/black pie-chart spheres (b) For $Ca_8B_{16}C_{30}$ at ambient pressure.

(c) For $Ca_8B_{16}C_{30}$ at ambient pressure.

Type-I Ca$_8$C$_{46}$ phonon dispersions

Type-I $Ca_8B_xC_{46-x}$ (black symbols)

$(La/Ca)_8B_xC_{46-x}$ (red stars)

BORON-STABILIZED TYPE-I AND TYPE-II CARBON CLATHRATES

PRIORITY CLAIM

This application claims priority to U.S. Provisional Application No. 63/527,763 filed Jul. 19, 2024, both filed in the United States Patent & Trademark Office, the disclosures of which are incorporated herein by reference in their entireties.

STATEMENT OF INTEREST

This invention was made with Government support from the U.S. Department of Energy (DOE), Office of Science, Basic Energy Sciences, under award no. DE-S00020683. The U.S. Government has certain rights in the invention.

FIELD OF THE INVENTION

The present invention relates to type-I carbon-based clathrate compounds such as $Ca_8B_xC_{46-x}$ and type-II carbon-based clathrates such as $Ca_{24}B_xC_{136-x}$ and other alkali, alkaline earth, and rare earth metal guest substitutions (e.g. $(Ca/La)_8B_xC_{46-x}$ or $(Ca/La)_{24}B_xC_{136-x}$) as well as methods of making the same.

BACKGROUND OF THE INVENTION

Carbon is a versatile and vital element with importance spanning the biological and physical sciences. The range of possible orbital hybridizations makes carbon atoms a unique building block for materials across diverse applications. A variety of carbon allotropes including one-dimensional nanotubes, two-dimensional graphene sheets, and three-dimensional diamond provide a range of exceptional electronic, optical, thermal, and mechanical properties. Whereas numerous two-dimensional carbon allotropes and compounds are known, a surprisingly limited number of three-dimensional, $sp^3$-hybridized carbon-based frameworks have been produced, despite numerous predictions of dynamically stable structures with formation enthalpies only slightly above diamond. Such 3D carbon-based structures have potential as superhard materials and may exhibit other superior optical, electronic and thermal properties. Aside from cubic diamond, hexagonal Lonsdaleite represents another superhard 3D carbon network, which has been observed in iron meteorites. When combined with other light elements, carbon forms heterodiamond structures including SiC, $BC_5$, $BC_2N$. Recently, $C_3N_4$ polytypes that were predicted to be less compressible than diamond were produced under high-pressure conditions.

Clathrates represent another class of 3D network structures. Clathrates are constructed from tetrahedral building blocks that form polyhedral cages capable of holding guest atoms or molecules. The polyhedral cages, which are typically comprised of 4-, 5-, and 6-membered rings, take on a variety of geometries depending on the specific structure type, and pack to fill three-dimensional space. Numerous clathrates with frameworks comprised of water molecules, the group-14 elements, and silica are already known. Carbon clathrates were first postulated after the formation of silicon clathrates, but despite decades of intensive research, pure carbon clathrate phases have not been produced to date. If formed, carbon clathrates would represent diamond-like superhard materials with compressive and tensile strengths predicted to exceed those of diamond. With vacant cages, these tetrahedrally coordinated lattices are predicted to be wide-gap semiconductors, but the introduction of guest atoms within the cages provides opportunities to tune the electronic structure to produce covalent metals and high-$T_c$ conventional superconductors. Low-frequency guest rattling modes found in these structures are also relevant to thermoelectric materials with low thermal conductivities.

Calculations based on DFT indicate that clathrates are low-energy carbon allotropes. Type-I and type-II clathrates—two of the most common structure types found in other tetrahedra systems—exhibit enthalpies near ~100 meV/atom relative to diamond, respectively. Carbon-carbon bond distances are similar to those found in diamond, but the presence of polyhedral cages results in structures with lower densities. As shown in FIG. 1(a), the unit cell of type-I clathrate contains two small [$5^{12}$] cages (pentagonal dodecahedra) and six large [$5^{12}6^2$] cages (tetradecahedra). The structure contains 46 framework atoms in space group of Pm-3n, and the 3D framework is constructed through occupation of the 6c, 16i, and 24k Wyckoff positions. Type-II clathrate contains sixteen small [$5^{12}$] cages and eight large [$5^{12}6^4$] cages (hexadecahedra). The unit cell contains 136 framework atoms in space group Fd$^-$ 3m with atoms occupying the 8a, 32e, and 96g Wyckoff positions (FIG. 1(b)). The type-II structure is predicted to be the most stable carbon clathrate framework. Carbon clathrate structures filled with guest atoms are also metastable structures, but have been predicted to exhibit low formation enthalpies at high pressure.

Whereas both filled and empty carbon clathrates still represent a major synthetic challenge, boron substitution within the carbon framework is a promising approach to stabilize these structure types. For two-dimensional, layered structures, several fascinating M-B-C materials are known, such as $MB_2C_2$ (where M=Mg, Sc, Ca, Y, or Ln) compounds with various structure types containing B-C rings. For example, $CaB_2C_2$ exhibits high-temperature ferromagnetism, and LiBC possesses planar heterographite layers intercalated with Li atoms. For three-dimensional materials, previous calculations on model clathrate systems for various structure types (I, II, IV, VII, and H) with Li guest atoms demonstrate that boron-substituted carbon clathrates are stabilized relative to their all-carbon counterparts. Metal-filled carbon clathrates are metallic, and the substitution of electron-deficient boron may open a gap to form an insulator through charge balance of the cage ions. Boron substitution also increases the average cage sizes due to the increased B-C bond lengths compared with C-C bonds. Following this approach, a thermodynamically stable B-C clathrate in the type-VII bipartite sodalite structure was recently identified via calculation and experiment for $SrB_3C_3$. $SrB_3C_3$ is predicted to be a high-temperature conventional superconductor with $T_c$ up to ~40 K at ambient pressure, and recent experiments indicate superconductivity above 20 K under pressure. Various guest atoms may be substituted within the clathrate cavities to tune the electronic structures and physical properties. For example, the occupation of trivalent guest atoms results in the formation of semiconducting materials such as $LaB_3C_3$, distorted $ScB_3C_3$ is predicted to be a ferroelectric with high polarization density, and other guest atom combinations may be used to tune the density of states at the Fermi level to produce superconductors with high transition temperatures approaching ~100 K. In addition, metastable clathrates with different boron contents such as $SrB_2C_4$ and $LaB_4C_2$ have been investigated computationally at 50 GPa.

The experimental realization of type-VII C-B clathrates validates the stabilization principle based on boron substitution and suggests that other carbon clathrate structure types might be realized using the same approach. Indeed, previous calculations of model type-I and type-II systems demonstrate boron stabilization conceptually, however no thermodynamically stable substitution schemes have been identified for structures other than type-VII. Applicants performed a systematic computational study of all charge-balanced boron substitution combinations for type-I and type-II carbon clathrate structures with symmetry greater than P1 for group-I and group-II guest elements with different cage occupancy schemes. The potential energy surfaces (PES) for structures containing metal (M) atoms with compositions $M_{6/8}B_xC_{46-x}$ and $M_{8/24}B_yC_{136-y}$ were explored using density functional theory (DFT) calculations up to 50 GPa for type-I and type-II clathrates, respectively, and the resulting factors that govern their stabilities were determined. Several low-energy boron decoration schemes were identified, including the first type-I structure that is thermodynamically stable on the ternary convex hull at 50 GPa, $Ca_8B_{16}C_{30}$. The results indicate that several boron-substituted carbon clathrate structures can be experimentally realized, suggesting potential for a large family of novel diamond-like materials with tunable properties.

Subsequently, the experimental type-I clathrate ($Ca_8B_xC_{46-x}$ with x≈9) was validated using experimental high-pressure synthesis combined with single-crystal X-ray diffraction. Substitutionally disordered boron atoms replace $sp^3$-hybridized carbon on hexagonal ring positions, thereby reducing strain energy associated with mismatch between the ideal hexagonal and tetrahedral angles. The synthesized clathrate is recoverable to ambient conditions, and may also be produced with elemental mixtures in which different guest atoms occupy the same or different cage types within the structure.

Accordingly, the principal object of the invention is to provide carbon-based structures, principally in the form of carbon-based clathrate compounds. Other objects will also be apparent from the detailed description of the invention.

SUMMARY OF THE INVENTION

Broadly stated, the objects of the invention are realized through the prediction and synthesis of clathrate compounds that include a carbon clathrate lattice stabilized by the substitution of boron atoms within the framework, as well as a variety of guest atoms. More specifically, the carbon-based clathrate compounds can include (i) a clathrate lattice with atoms of at least one element selected from the group consisting of carbon and boron for the host cage structure; and (ii) guest atoms encapsulated within the clathrate lattice cages.

According to one aspect of the invention, the guest atom is Calcium (Ca). In another aspect of the invention, the guest atoms may also include Na, Sr, La or other atoms with a similar ionic radius, as well as combinations of different guest atoms.

According to another aspect of the invention, the carbon-based clathrate compound has the cubic type-I clathrate structure containing two small [$5^{12}$] cages (pentagonal dodecahedra) and six large [$5^{12}6^2$] cages (tetradecahedra) in a cubic unit cell with 46 framework atoms.

According to another aspect of the invention, the carbon-based clathrate compound has the cubic type-II clathrate structure containing sixteen small [$5^{12}$] cages (pentagonal dodecahedra) and eight large [$5^{12}6^4$] cages (hexadecahedra) in a cubic unit cell with 136 framework atoms.

According to another aspect of the invention, the clathrate lattice is stabilized by boron atoms, which are energetically favorable at hexagonal ring sites.

According to another aspect, the invention includes carbon clathrate compounds derived from ordered boron site occupation, including type-I $Na_8B_8C_{38}$, $Sr_8B_{16}C_{30}$, $Ca_8B_{16}C_{30}$ and type-II $Ca_6B_{12}C_{22}$ ($Ca_{24}B_{48}C_{88}$ for the full unit cell) According to another aspect, the invention includes the type-I clathrate compound of the formula $Ca_8B_xC_{46-x}$ in which boron is substitutionally disordered.

According to another aspect of the invention, the $Ca_8B_xC_{46-x}$ compound is a carbon-based clathrate. In another embodiment, this carbon-based clathrate has the type-I clathrate structure. In another embodiment of the invention, the compound comprises a clathrate lattice with atoms selected from the group consisting of carbon and boron as a host cage structure. In another embodiment of the invention, the clathrate lattice is formed of $sp^3$ hybridized carbon and boron.

According to one aspect of the invention, calcium is a guest atom/ion encapsulated within the cages of the clathrate lattice. According to another aspect of the invention, the type-I clathrate lattice comprises two small [$5^{12}$] cages (pentagonal dodecahedra) and six large [$5^{12}6^2$] cages (tetradecahedra).

According to one aspect of the invention, mixtures of guest atoms/ions may be encapsulated within the cages of the clathrate lattice. According to another aspect of the invention, the type-I clathrate lattice comprises two small [$5^{12}$] cages (pentagonal dodecahedra) and six large [$5^{12}6^2$] cages (tetradecahedra). Different guest atoms/ions may occupy both or either of these cages with variable composition.

Advantageously, type-I and type-II boron-substituted carbon clathrates may exhibit tunable electronic properties ranging from semiconductor to metal or superconductor, depending of the type and distribution of guest atoms within the cages, and the distribution/composition of boron within the framework.

According to one aspect of the invention, the compound of the formula $Ca_8B_xC_{46-x}$ has a bulk modulus of 244(8) GPa. In another embodiment of the invention, the compound of the formula $Ca_8B_xC_{46-x}$ has a has a calculated hardness between 30-39 GPa.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is more fully described by reference to the following detailed description and the accompanying drawings wherein:

FIGS. 2(a), 2(b), 2(c), 2(d), 2(e), and 2(f) show stability trends for type-I and type-II clathrates.

FIGS. 3(a), 3(b), 3(c), 3(d), 3(e), 3(f), 3(g) and 3(h) show analyses of stability for various compositions and structures of type-I and type-II clathrates.

DETAILED DESCRIPTION OF THE INVENTION

Figure 1A:
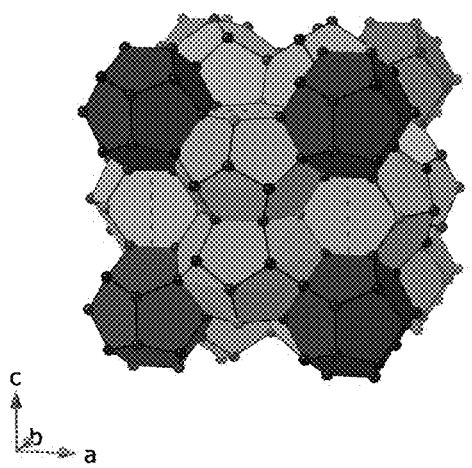
FIG. 1(a) shows the basic type-I clathrate structure.

Carbon clathrate is an impressive 3D sp³ material. Carbon-based clathrates are open-framework structures composed of host cages that trap guest atoms in which all host atoms are linked by four-coordinate bonds. As sp³-bonded frameworks, carbon-based clathrates represent strong and lightweight materials that also offer tunable properties through manipulation of the occupancy and type of guest atoms within the cages. Despite their prominence in other systems with tetrahedral coordination, carbon-based clathrates have not yet been reported due to tremendous challenges associated with their synthesis.

Attempts to synthesize carbon clathrates go back at least 50 years since they were postulated following the formation of inorganic silicon clathrates, and their possible structures and properties are of longstanding interest. However, carbon clathrates have not been successively synthesized yet. Some proposed but unrealized carbon clathrates are expected to exhibit exceptional mechanical properties with tensile and shear strengths exceeding diamond, while large electron-phonon coupling is predicted to give rise to conventional superconductivity with high transition temperatures. If produced, these materials may represent a class of diamond-like compounds wherein the electronic structure is tunable by adjusting the occupancy of electron-donating (or withdrawing) atoms within the cages.

The inventors have performed a substantial amount of research to answer the persisting question of whether carbon clathrate structures are accessible by experiment. First-principles DFT calculations indicate that both filled and guest-free carbon clathrates are energetically unfavorable but by energies as low as 0.07 eV/atom relative to diamond (for reference, commercially produced $C_{60}$ is metastable by nearly six times that energy). Synthesis of carbon clathrates might therefore proceed through a non-equilibrium pathway (e.g., formation from a high-energy precursor or deposition method) or through a chemical substitution/doping strategy to modify the intrinsic thermodynamic stability. No successful metastable pathways to carbon clathrates have been established yet, although three-dimensional polymers of $C_{60}$ have been suggested to resemble carbon clathrate-like structures.

While non-equilibrium synthesis pathways remain feasible in concept, another strategy is to substitute boron for carbon atoms within the cage frameworks of carbon clathrates. The electron deficient nature of boron creates the ability to form complex chemical bonding with itself or carbon to stabilize polyhedra, such as the icosahedral units in molecular carborane clusters. Zeng et al. calculated that boron substitution can improve the intrinsic thermodynamic stability of carbon clathrate frameworks. Nevertheless, no thermodynamically stable carbon-clathrate was predicted after examination of a small subset of possible B substitution schemes in Li-filled carbon clathrates. A comprehensive understanding of potential B substitution schemes was therefore needed to validate this chemical stabilization principle.

Figure 1B:
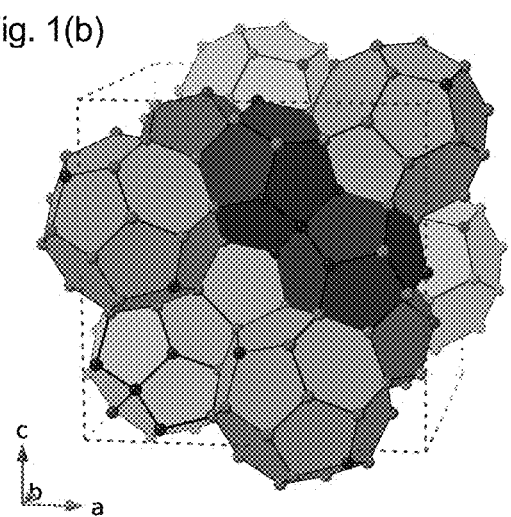
FIG. 1(b) shows the basic type-II clathrate structure.

The inventors performed extensive stabilization calculations considering alkali and alkaline earth metals trapped within either the large cages, or both the large and small cages, of type-I and type-II carbon clathrates (See FIG. 1(a) and FIG. 1(b)), and assumed boron substitution schemes that result in overall charge balance (i.e., only insulators). For example, a monovalent guest occupying only the large cages of type-I clathrate would require six boron atoms in the unit cell for charge balance, i.e., a composition of $M_6B_6C_{40}$. The number of possible decorations of n carbon sites with nB boron atoms, P(n/nB) is given by the equation:

$$P(n/nB) = n!/(nB!(n-nB)!)$$

For the case of type-I clathrate with six boron atoms and 46 framework atoms per formula unit, there are 9,366,819 possible decorations, which is computationally intractable for calculations based on DFT. Similar difficulties arose for most of the boron counts considered for both the type-I and type-II clathrates. To reduce the number of structural combinations, all structures that contain B-B contacts were removed from consideration. This is analogous to the Al-avoidance rule in silicates and aluminates. Such structures are assumed to be electrostatically unfavorable due to formal charges of boron. To further reduce computational complexity in systems with large numbers of unique combinations, we discarded all structures with P-1 space group symmetry (those with only translational symmetry). The resulting boron decoration schemes were enumerated using a brute-force symmetry-based (BFSB) method and a branch-and-bound algorithm. The resulting list of decorations was cross validated by systematically comparing the output from the two methods.

Table 1 contains a summary of the enumeration results for the cases considered, each of which was calculated using guest atoms of group-I (Li-Cs) and group-II (Mg-Ba) elements at two pressures (10 and 50 GPa). Structures containing Be were not considered due to the small size of the ion and its tendency to form covalent bonds. Approximately 46,000 different DFT calculations were performed to determine detailed stability trends for boron-substituted type-I and type-II clathrates.

TABLE 1

The number of possible boron-substitution combinations for different clathrate scenarios, unique combinations without duplicates or B-B contacts, and unique combinations without P-1 structures for each composition.

| Type | B:C | Guest, Cages | $n_{total}$ | $n_{unique, no B-B}$ | $n_{Non-P 1, no B-B}$ |
|---|---|---|---|---|---|
| I | 6:40 | Group I, [$5^{12}6^2$] | 9,366,819 | 42,406 | 903 |
| I | 8:38 | Group I, [$5^{12}6^2$] + [$5^{12}$] | 260,932,815 | 262,612 | 2,071 |

TABLE 1-continued

The number of possible boron-substitution combinations for different clathrate scenarios, unique combinations without duplicates or B-B contacts, and unique combinations without P-1 structures for each composition.

| Type | B:C | Guest, Cages | $n_{total}$ | $n_{unique,\ noB-B}$ | $n_{Non-P\ 1,\ noB-B}$ |
|---|---|---|---|---|---|
| I | 12:34 | Group II, $[5^{12}6^2]$ | 38,910,617,655 | 218,179 | 1,513 |
| I | 16:30 | Group II, $[5^{12}6^2]$ + $[5^{12}]$ | 991,493,848,554 | 128 | 26 |
| II | 2:32 | Group I, $[5^{12}6^4]$ | 561 | 21 | 17 |
| II | 4:30 | Group I, $[5^{12}6^4]$ + $[5^{12}]$ | 46,376 | 492 | 123 |
| II | 6:28 | Group II, $[5^{12}6^4]$ | 1,344,904 | 3,201 | 310 |
| II | 12:22 | Group II, $[5^{12}6^4]$ + $[5^{12}]$ | 548,354,040 | 7 | 6 |

FIGS. 2(a) and 2(b) show the enthalpies of formation ($\Delta H_F$=H($M_xB_yC_z$)-xH(M)-yH(B)-zH(C), where H represents the enthalpy of each element or compound) as a function of pressure for the type-I and ∥ clathrate cases, respectively. Structures containing Rb and Cs as guest elements are excluded from these plots due to their large formation enthalpies, as discussed in detail below. Individual data points for a given composition and pressure form "band-like" features with a range of formation enthalpies that span roughly 50-150 meV/atom. Comparing the bands of constant composition at two pressures reveals that the structures are generally stabilized as pressure increases from 10 to 50 GPa for both type-I and ∥ clathrates. Several of the compositions show negative formation enthalpies for both type-I and type-II clathrates, with particularly large exothermic driving forces relative to mixtures of the ground-state elemental structures at 50 GPa. Increased stability with pressure is consistent with other $sp^3$ structures including diamond and type-VII C-B clathrates. Both cases with Li in the large cages, and Mg in the large cages for type-II clathrate, are an exception to this trend and are destabilized with increased pressure. The small sizes of Li and Mg cations may not be sufficient to stabilize clathrates at high pressure when only the large cages occupied, and these phases become destabilized with increased compression. Given the overall general trend of enhanced stability with increasing pressure, Applicants focus the disclosure herein on the results obtained at 50 GPa.

The large number of optimized structures allows for the investigation of possible stability trends with structural symmetry, as shown in FIGS. 2(c) and 2(d). As the symmetry index increases, the symmetry of the decorated phase decreases. For all cases, there is no apparent correlation with symmetry index and formation enthalpy, although in cases where all decorations were examined explicitly, no structures with P-1 symmetry were found as the ground state. While we cannot explicitly rule out the possibility of cases with a P-1 ground state for other clathrate compositions, the assumption of non-P-1 ground states appears justified for the most stable compositions and P-1 structures were not considered for those cases during subsequent analysis.

As shown in FIGS. 2(e) and 2(f), the formation enthalpies of the various clathrate structures show a strong dependence on the Shannon crystal radii of the metal guest elements. All structures containing K, Rb, Cs, and Ba exhibit positive formation enthalpies which we attribute to their atomic radii being too large for the cages. Clathrates with small ions like Li and Mg may exhibit negative formation enthalpies depending on the specific occupancy configuration, but may be generally too small for ideal clathrate stability. The most stable guest ions are those with intermediate sizes including Na, Ca, and Sr, which appear to best suited to stabilize the boron-substituted clathrate cages, as confirmed by their negative enthalpies of formation. Structures with Li, Na, Mg, and Ca as guest atoms show a general preference for both large and small cages to be filled compared with structures where only the large cages are filled. This trend is not observed for structures with K, Rb, Cs, and Ba, likely due to the energy penalty associated with occupying these larger ions within the small $[5^{12}]$ cages.

The large number of optimized clathrate structures with different boron decorations allows for the examination of stability trends for different coloring schemes and to determine the impact of substitutions on specific framework sites. In general, no clear stability trends were observed regarding nearest-neighbor C—C, B—C or guest-B/C distances, however structures with expanded large $[5^{12}6^2]/[5^{12}6^4]$ cages and contacted small $[5^{12}]$ cages were found to generally exhibit lower enthalpies for both clathrate structure types of a given composition.

These overall trends are a consequence of the tendency of boron to substitute framework positions within the six-membered rings of the large cages in order to minimize bond angle strain, as shown below.

Continuing with the most stable guest elements for type-I and type-II clathrates, the enthalpies of structures containing Na and Ca are plotted as a function of the average $[5^{12}]$ cage radius (average distance between cage centers and vertices) in FIG. 3. Overall, structures with smaller $[5^{12}]$ cages tend to exhibit lower enthalpies, as do structures with larger $[5^{12}6^2]/[5^{12}6^4]$ cages. The specific framework locations of B atoms impact the size of the cages for different colorings because the averaged B-C bond distances (which range from 1.54-1.80 Å) are longer than the averaged C—C bond distances (1.51-1.69 Å), leading to larger cage sizes when more B atoms are positioned on cage vertices.

For both type-I and type-II clathrates, the energetic favorability of structures with smaller [512] cages is a consequence of preferential boron occupation of framework sites within large cages. This energetic preference is observed through inspection of B occupation on the three specific Wyckoff sites for type-I (6c, 16i, 24k) and type-II (8b, 32e, 96g) clathrates. Note that B-decorated structures possess lower symmetry and different specific Wyckoff sites compared with the undecorated frameworks. For clarity, we refer to the original sites from which substituted positions originate in the parent structures.

The overall trend of calculated enthalpy as a function of average $[5^{12}]$ cage radius is divided into layers that correspond to the number of B atoms on specific Wyckoff sites, as illustrated in FIG. 3, where different colors represent the number of B atoms on the 6c and 96g sites for type-I and type-II clathrates, respectively. For type-I clathrates, the symbol sizes are proportional to the number of B atoms located in the hexagonal rings of the $[5^{12}6^2]$ cages. The hexagonal rings in type-I clathrate are comprised of both 6c and 24k sites. In contrast, for type-II clathrates, all symbols with the same colors are the same size since the number of B atoms located in the hexagonal rings of the $[5^{12}6^4]$ cages is equivalent to the number of B atoms occupying the 96g sites (hexagonal rings in type-II are exclusively comprised of 96g sites). The single-colored layers observed for type-II clathrate structures are further separated into additional clusters with the same colors for type-I clathrate structures (the same number of B atoms per 6c site). Points within a given cluster have an identical number of B atoms occupied on the other Wyckoff positions, and lower-enthalpy clusters possess more boron atoms per hexagonal ring (larger symbols). These clusters are not present for type-II clathrate structures as the six-membered rings of the $[5^{12}6^4]$ cages are comprised of a single Wyckoff site.

For monovalent guest atoms in type-I clathrate with exclusive large cage occupation, six boron atoms must be distributed on the framework to preserve charge balance, e.g., $Na_6B_6C_{40}$ in FIG. 3(a). The most stable configuration in this case is complete occupation of the 6c site with no change from the starting $Pm\bar{3}n$ crystal symmetry. The 6c atoms are located exclusively in the six-membered rings of the large cages, resulting in a structure with the smallest average $[5^{12}]$ cage radius. When the small cages are also occupied, two additional B atoms must be substituted into the framework, e.g., $Na_8B_8C_{38}$ in FIG. 3(b). In this case, the most stable configurations contain partial B occupation of the 6c site (e.g., three of six positions), increased B occupation of the 24k site, and a reduction in unit cell symmetry. Increased B occupation of the 24k site results in the expansion of both cages as this site is shared between $[5^{12}]$ and $[5^{12}6^2]$ cages. The increased B occupation of 24k is the origin of the trend of decreasing energy with increasing $[5^{12}]$ cage radius for layers of constant boron occupancy on the 6c sites, which is paradoxical to the overall trend of increasing energy with average $[5^{12}]$ cage radius.

Cases with monovalent guest occupancy in type-II clathrates, e.g., FIGS. 3(c) and 3(d), show the same general trend of increasing energy with average $[5^{12}]$ cage radius. Type-II structures exhibit an energetic preference for boron occupancy on the 96g sites, which exclusively comprise the six-membered rings of the $[5^{12}6^4]$ cages. The 96g sites are shared vertices between $[5^{12}]$ and $[5^{12}6^4]$ cage types, and the most stable type-II clathrates therefore generally possess larger small cages than type-I clathrates. The different connectivity and ratios of shared vertices between large and small cages of type-I and type-II clathrates result in opposite enthalpy trends within layers of constant 6c/96g boron occupancies with respect to average $[5^{12}]$ cage radii.

Cases with divalent guests in both clathrate types, e.g., Ca in FIGS. 3(e) through 3(h), generally show similar trends to cases with monovalent guests, although fewer unique structures are possible for type-II with both cages occupied. Divalent guests require double the amount of boron needed for overall charge balance, and thus specific site occupancy trends differ from the monovalent cases. Both cage occupancy cases for type-I require more than six boron atoms and therefore mixed occupation of the hexagonal-ring 24k and 6c sites provides the most energetically stable structures, while occupation of 16i remains unfavorable. Similarly, occupation of the hexagonal rings on the 96g site remains most favorable for type-II clathrate. The exception to this trend is the occupancy of both cages in type-II, e.g., $Ca_6B_{12}C_{22}$ in FIG. 3(h), where the most stable structure of this limited data set shows partial occupancy on the 32e sites. Occupation of the 32e site appears to reduce the overall cell volume in cases with high boron content and reduces enthalpy from the PV contribution.

Figure 4A:
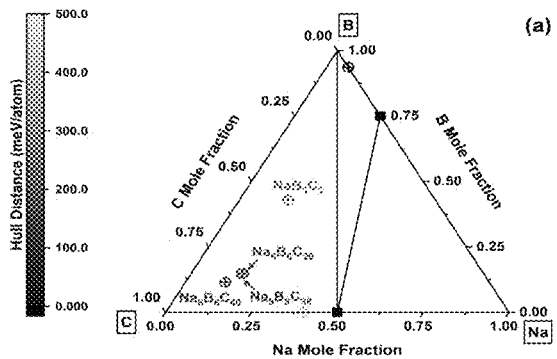
FIGS. 4(a), 4(b), and 4(c) show ternary phase diagrams for the Na, Ca and Sr systems, showing low-energy and stable clathrate phases.
Figure 4B:
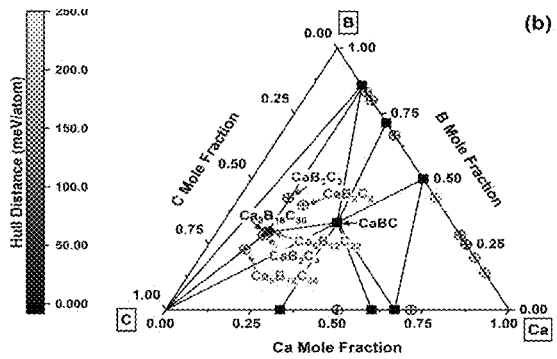
Figure 4C:
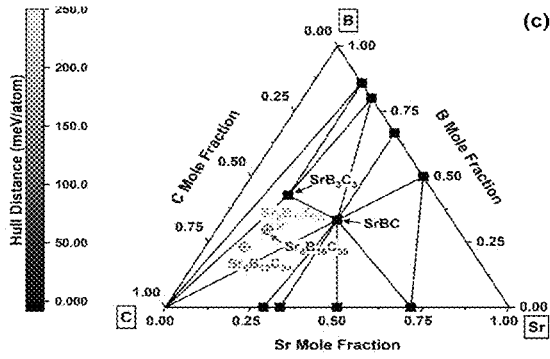

As shown in FIG. 2, several type-I and type-II clathrate structures with various guest atoms show negative formation enthalpies, indicating that a range of structures/compositions may be synthesizable. Given the favorable formation enthalpies calculated for the Na—B—C, Ca—B—C, and Sr—B—C clathrates, we constructed three-dimensional convex hull plots for these systems at 50 GPa, as depicted in FIGS. 4a-4(c). FIG. 4(a) shows the Na—B—C system, where the binary compounds $Na_2C_2$ and $NaB_3$ are thermodynamically stable. Type-I $Na_8B_8C_{38}$ clathrate with both cages occupied is found to be metastable and is located 104.5 meV/atom above the convex hull. Although the lowest-energy, sodium-filled type-II clathrate structure exhibits a negative formation enthalpy, it is 185.1 meV/atom above the convex hull.

For the Ca—B—C system in FIG. 4(b), $Ca_2C$, $Ca_3C_2$, $CaC_2$, $CaB$, $Ca_2B_5$, and $CaB_6$ were determined to be thermodynamically stable binary phases. In addition, type-I $Ca_8B_{16}C_{30}$ clathrate with both cages occupied was found to be a thermodynamically stable ternary phase located on the convex hull. This structure has the space group R3, and its detailed structural and electronic properties are discussed below. Type-VII $CaB_3C_3$, the analogue of $SrB_3C_3$ that was experimentally synthesized, was found to be slightly above the convex hull by 25.8 meV/atom at 50 GPa. In addition, hexagonal CaBC (LiBC structure type) was found to be thermodynamically stable at 50 GPa. For Ca-filled type-II clathrate with both cages filled the formation enthalpy is also negative, however this phase is metastable and located 100.1 meV/atom above the convex hull.

At 50 GPa, the Sr—B—C system shown in FIG. 4(c) contains $Sr_2C_5$, $SrC_2$, $SrC$, $Sr_5C_2$, $SrB$, $SrB_2$, $SrB_4$ and $SrB_6$ as thermodynamically stable binary phases, as well as the known ternary phases $SrB_3C_3$ and SrBC. Type-I $Sr_8B_{16}C_{30}$ clathrate, the Sr analogue of stable $Ca_8B_{16}C_{30}$, is metastable but is located only 49.5 meV/atom above the hull, making it within the synthesizable energy range of metastable phases. Once again, the most stable type-II clathrate phase with both cages filled with Sr is metastable with a hull distance of 194.3 meV/atom.

Figure 5:
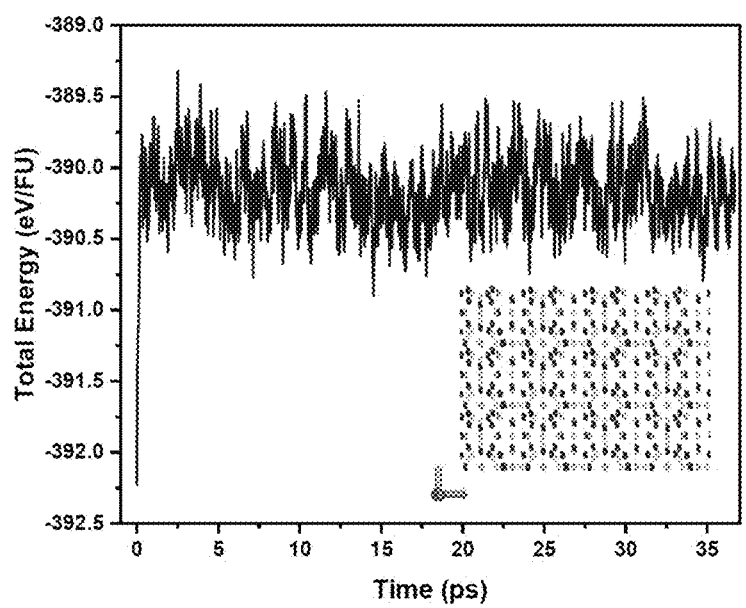
FIG. 5 shows a molecular dynamics trajectory for $Ca_8B_{16}C_{30}$ at 0 GPa and 300 K showing dynamic stability.

The predicted phase $Ca_8B_{16}C_{30}$ represents the first thermodynamically stable carbon-based, type-I clathrate framework. This phase has a large negative formation enthalpy of approximately −500 meV/atom at 50 GPa suggesting that it may be synthesized from a mixture of constituent elements or binary compounds. $Ca_8B_{16}C_{30}$ is dynamically stable from 0-50 GPa, and molecular dynamics simulations over a limited duration suggest stability at ambient pressure and 300 K as shown in FIG. 5. In addition, several other predicted clathrate structures exhibit negative formation enthalpies and small distances from the convex hull including type-I $Sr_8B_{16}C_{30}$, type-II $Ca_6B_{12}C_{22}$, and type-I $Na_8B_8C_{38}$, with hull distances of ~50, ~100 and ~105 meV/atom, respectively. Careful selection of the synthetic precursors and pathway considerations may produce viable strategies to synthesize these dynamically stable structures, and intrinsic thermodynamic stability may improve under different PT conditions. A recent review of the Inorganic Crystal Structure Database (ICSD) revealed that approximately 90% of known crystalline inorganic metastable compounds are within ~70 meV/atom of the ground state at 0 K.

To further confirm the interactions and properties of the clathrates described in this work, Applicants analyzed charge transfer between guest and host, and calculated the electronic density of states for the three most stable compounds. Table 2 shows electronic properties for the most stable boron-substituted type-I carbon clathrate structures filled with Na, Ca and Sr atoms. In all three cases, electrons are transferred from the guest metals to the host frameworks creating positively charged metal ions within the clathrate cavities. Electron-deficient boron can accept an electron to produce tetrahedral bonding in the network with a formal negative charge, as in the $B(CH_3)^{4-}$ model mentioned above.

Due to the polar covalent B—C bonding between framework atoms, with carbon having a larger electronegativity, B atoms are positively charged and C atoms are negatively charged. For monovalent-filled type-I $Na_8B_8C_{38}$, in which the lowest-energy structure has tetragonal symmetry with space group P $4_2$mc, the calculated average Bader charge for Na is +0.72 while the average Bader charges of B and C are +1.74 and −0.52, respectively. For divalent-filled type-I $Ca/Sr_8B_{16}C_{30}$, both ground-state trigonal (space group R3) compounds have similar average Bader charges of approximately +1.33, +1.54 and −1.18 for Ca/Sr, B and C, respectively. All three structures are charge-balanced insulators with DFT band gaps ranging from 2.50 to 2.87 eV, as expected from the initial compositional design of this study. The stability of unbalanced M:B ratios was not explored here, however low-energy metallic structures, similar to $SrB_3C_3$, are anticipated with different boron compositions or metal guest ratios.

TABLE 2

Electronic properties of the most stable Na—B—C, Ca—B—C, and Sr—B—C clathrate structures. The DFT-calculated band gaps likely represent an under-estimate.

| Composition | Space group | Metal Bader Charge (e) | B Bader Charge (e) | C Bader Charge (e) | Band gap (eV) |
|---|---|---|---|---|---|
| $Na_8B_8C_{38}$ | P $4_2$mc | +0.72 | +1.74 | −0.52 | 2.87 |
| $Ca_8B_{16}C_{30}$ | R3 | +1.31 | +1.57 | −1.20 | 2.50 |
| $Sr_8B_{16}C_{30}$ | R3 | +1.34 | +1.50 | −1.16 | 2.63 |

Figure 6A:
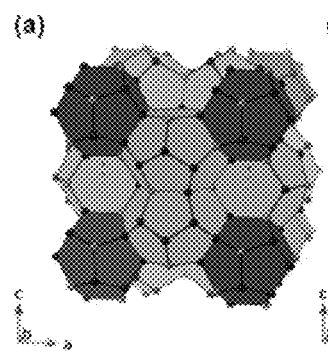
FIGS. 6(a), 6(b), 6(c) show the crystal structure of stable R3 $Ca_8B_{16}C_{30}$ at 50 GPa and electronic density of states.
Figure 6B:
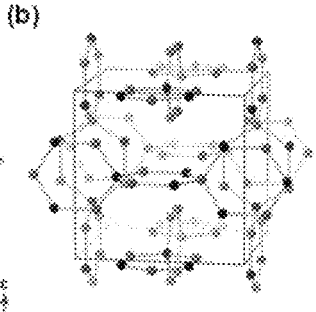

The crystal structure of thermodynamically stable $Ca_8B_{16}C_{30}$ clathrate, which has space group R3 for the ordered, boron-substituted type-I lattice, is shown in FIG. 6(a). Boron within this structure is substituted primarily on the 9b Wyckoff sites, with a portion of B atoms occupying the 3a sites. This optimal substitution scheme corresponds to the majority of boron located at the hexagonal-ring 24k and 6c and Wyckoff sites, with a small fraction of boron located on the 16i sites of the Pm$\bar{3}$n parent structure. The average distance between cage centers and vertices for $Ca_8B_{16}C_{30}$ is 2.473 Å and 2.249 Å for the large and small cages, respectively. FIG. 6(b) shows the chains of hexagonal rings for stable type-I $Ca_8B_{16}C_{30}$ with occupied boron positions colored in pink. For the case of $Ca_8B_{16}C_{30}$, all hexagonal rings are comprised of alternating boron and carbon atoms, yielding the maximum hexagonal substitution scheme possible without creating any B-B contacts. The hexagonal-plane/BCB angle ranges from 115.4°-123.9°, while the/CBC angle ranges from 114.7°-122.7°.

Figure 6C:
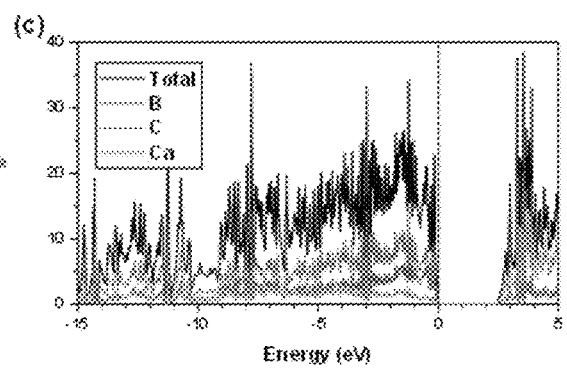

FIG. 6(c) displays the electronic density of states for the stable type-I $Ca_8B_{16}C_{30}$ phase, indicating it is an insulator with a calculated DFT band gap of 2.50 eV. The total valence electron count for this structure is similar to that of type-I pure carbon clathrate, reflecting overall charge balance and its insulating properties. The dominant contributions to the DOS just below the Fermi level are comprised of C and B hybrid states, whereas the bottom of the conduction band is dominated by Ca states.

The sp$^3$, diamond-like lattice of carbon clathrate structures results in exceptional mechanical properties, for example, high hardness and strength. For the case of boron-substituted structures, elastic moduli remain high, although reduced from the case of pure carbon due to the introduction of B—C bonds, and increased metallicity in some cases with occupied cages. For $Ca_8B_{16}C_{30}$ the zero-pressure bulk modulus, $B_0$ is estimated to be 256 GPa, with pressure derivative $B_0'$=3.8, based on DFT calculations. This value is comparable to type-VII $MB_3C_3$ clathrates and advanced structural ceramic materials such as boron carbide.

Following predictions of thermodynamically stable $Ca_8B_{16}C_{30}$, the experimental synthesis of this phase was targeted at ~50 GPa using laser-heated diamond anvil cells combined with in situ synchrotron X-ray diffraction for structural characterization. After heating compressed precursor samples at temperatures above ~2500 K, new diffraction peaks appeared that were readily indexed to the cubic type-I clathrate structure (a=7.046 Å at ~50 GPa), in addition to cubic type-VII $CaB_3C_3$ clathrate (a=4.529 Å, isostructural with $SrB_3C_3$). Prolonged heating above 3000 K produced grains that were suitable for single-crystal diffraction methods.

Figure 10:
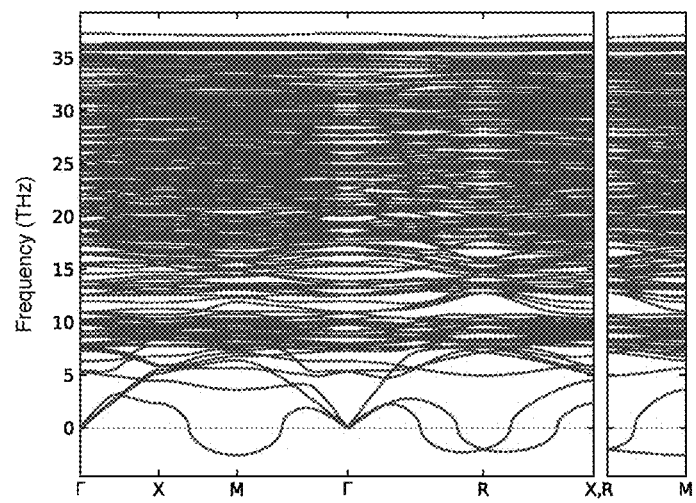
FIG. 10 shows phonon dispersion relations for type-I $Ca_8C_{46}$ at 50 GPa.

Single-crystal structure solution revealed Ca atoms located on the 2a and 6d positions, and unambiguously revealed the type-I Pm$\bar{3}$n clathrate with framework atoms located on the 6c, 16i, and 24k positions. The initial all-carbon framework solution provides excellent structural refinement indicators (R1=0.035), however this model (i.e., $Ca_8C_{46}$) is energetically implausible with a calculated convex hull distance >700 meV/atom at 50 GPa. Furthermore, $Ca_8C_{46}$ is dynamically unstable with imaginary phonon frequencies throughout the first Brillouin zone as shown in FIG. 10. Thus, boron atoms must substitute within the type-I framework for stability, and the high quality of the all-carbon structural model reflects the difficulty in distinguishing carbon from boron using X-ray diffraction given the one-electron differential between the elements. After systematic refinement of possible boron distribution schemes in the cubic unit cell, a model with partial boron occupation of the 24k site gave the best structural refinement indicators (R1=0.032) with the composition $Ca_8B_{8.8(14)}C_{37.1(14)}$ (1□ standard uncertainty), or $Ca_8B_{9\pm3}C_{37\pm3}$ with 95% probability (2□ level confidence interval). Boron occupation of the 16i site is disfavored, leading to unphysical occupancy factors. A small fraction of boron on the 6c site, in addition to 24 k, is statistically possible (R1=0.033), and with partial occupancy of both sites, the estimated uncertainty in the refined B composition, x, ranges between 7≤x≤15 with 95% probability. Detailed refinement models and parameters are shown in TABLES 3 and 4.

The experimentally observed structure is in good agreement with the thermodynamically stable phase predicted by Applicant. A key difference is the requirement of ordered boron decorations in the static calculations, which require a lowering of symmetry from cubic (Pm$\bar{3}$n) to rhombohedral (R3) for the unit cell to accommodate the boron atoms. Partial site occupancies are used to treat the statistical distribution of boron substitutions empirically. Nevertheless, the calculated rhombohedral distortion is miniscule with a=7.03 Å and □=89.99° for the optimized cell at 50 GPa (cf., a=7.05 Å and □□□□□□=90° from experiment), and the structure can be approximated as cubic, but with ordered Wyckoff positions.

Figures 7A, 7B, 7C:
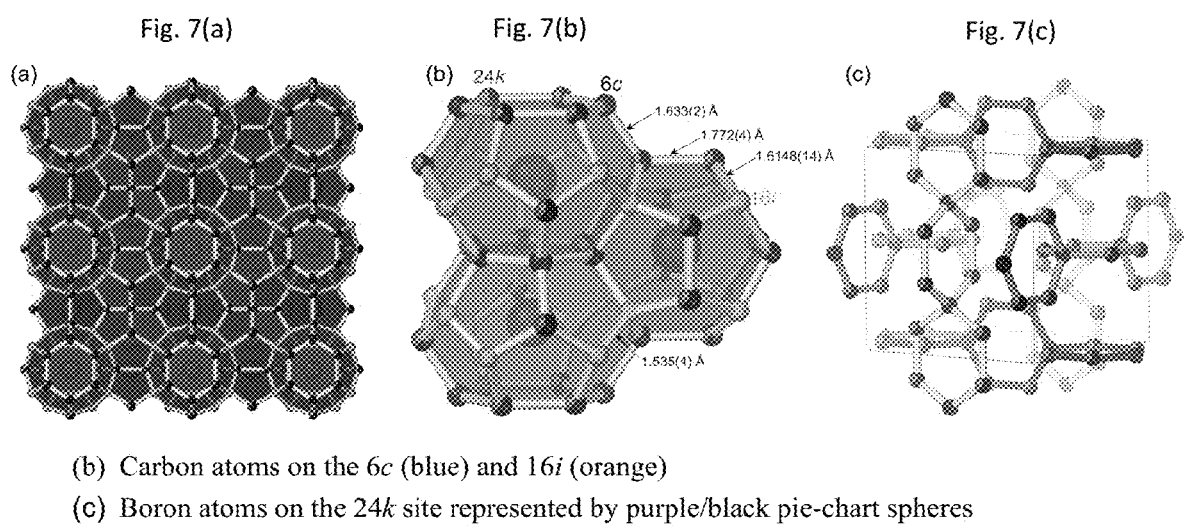
FIGS. 7(a), 7(b), and 7(c) show the experimental structure for type-1 $Ca_8B_xC_{46-x}$.

The experimentally determined type-I Ca—B—C clathrate structure is shown in FIG. 7(a) through 7(c). Like the predicted stable R3 $Ca_8B_{16}C_{30}$ structure, boron atoms in the experimental Pm3n structure are primarily located on the 24k Wyckoff position. (Note that the 3a and 9b sites of R3 are related back to sites found in the parent structure). Boron occupation of the 24k site in the experimental structure is clearly reflected in average bond distances. Average distances containing B—C contacts are longer (24 k-24 k=1.772(4) Å, 24 k-6 c=1.633(2) Å, 24 k-16 i=1.6148(14) Å) than distances that are exclusively C—C (16i-16i=1.535

(4) Å). The 24 k and 6c Wyckoff positions are associated with the hexagonal rings of the large [$5^{12}6^4$] cages. The 6c site is exclusive to the large cages, while sites of the hexagons associated with the 24k sites are common between small cages. Chains of perpendicular hexagonal rings (rotated 90° about the 6c position) run parallel along all opposing faces of the unit cell. Boron occupation of the hexagonal rings allows for the minimization of bond angle strain for the ~120° hexagonal angle compared with the ideal 109.5° angle for tetrahedral carbon, in excellent agreement with Applicant's predictions. It is notable that Al doping within type-I silicon clathrates follows a similar substitution scheme, whereas B doping in Si clathrates occurs predominantly on the 16i positions due to size mismatch.

Based on Applicant's predicted requirements for charge balance (i.e., 2B per Ca), the theoretical R3 $Ca_8B_{16}C_{30}$ structure is an insulating phase with a calculated DFT band gap of ~2.5 eV.40 While single-crystal diffraction results unambiguously confirm the cubic type-I clathrate structure with boron occupation on 24k, refinements of substitutionally disordered boron in the Pm3̄n lattice apparently violate this charge balance, although large uncertainties are associated with the XRD-derived boron composition. That is, the best structural refinements suggest only ~6-12 boron atoms per unit cell, which cannot entirely compensate charge from fully occupied calcium ions. Future electrical transport measurements on phase-pure samples (the coexisting $CaB_3C_3$ phase is metallic) will elucidate the electronic structure of the type-I clathrate and potential relevance to high-$T_c$ superconductivity as in related materials. Many clathrate compounds of heavier tetrel elements are known to deviate from precise electron counts. The possibility for substitutions of a variety of guest ions within the large and small cages (e.g., mono/trivalent), in combination with different framework coloring schemes, provides wide potential to systematically tune the physical properties of these compounds.

Figure 8A:
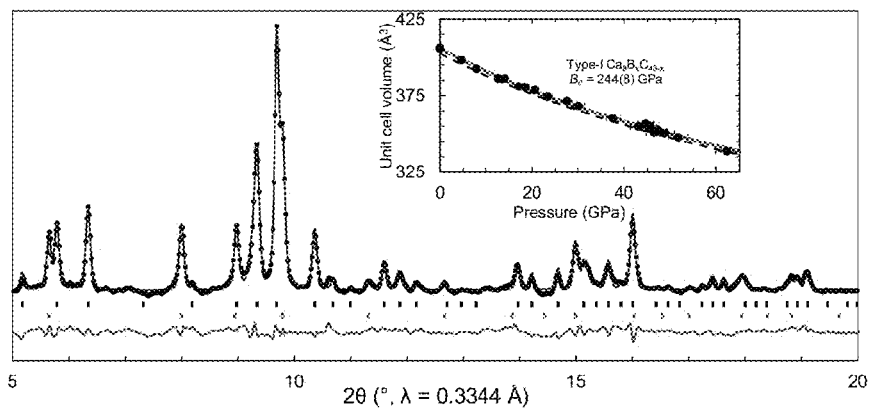
FIGS. 8(a), 8(b), and 8(c) show the XRD refinement for recovered $Ca_8B_xC_{46-x}$ and ideal strength.
Figure 8B:
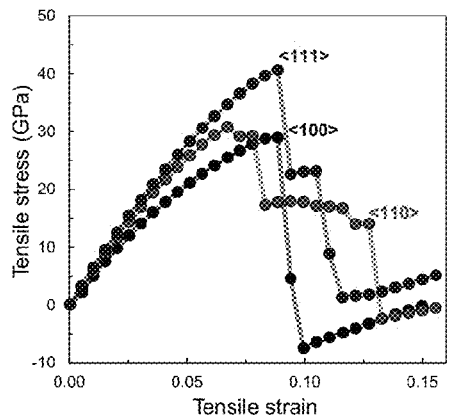
Figure 8C:
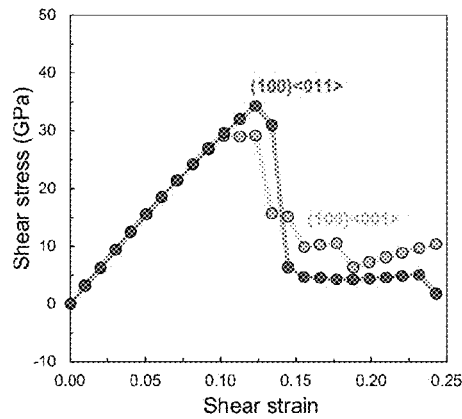

Powder X-ray diffraction measurements obtained during decompression as shown in TABLE 5 indicate that the clathrate is recoverable to ambient conditions and persists in air for the maximum duration tested (several hours during synchrotron time). Rietveld refinement of powder data obtained at ambient pressure reveals only minor perturbations from the structural model obtained at ~50 GPa, showing an expanded lattice parameter of a=7.4040(2) Å at 1 atm as shown in FIG. 8(a). Pressure-dependent refinements of the type-I unit cell volume and equation of state analysis revealed a zero-pressure bulk modulus $B_0$=244(8) GPa, in good agreement with the calculated value for R3 $Ca_8B_{16}C_{30}$ ($B_0$=256 GPa). This agreement suggests that calculated structural properties of the R3 model are largely representative of the experimentally observed cubic cell. The type-I compressibility is similar to type-VII $SrB_3C_3$ and $LaB_3C_3$ clathrates, and ~14% larger than that of $CaB_3C_3$ (experimental $B_0$=214(10) GPa; calculated $B_0$=224 GPa). Based on first principles calculations, the smallest tensile strength of the new clathrate is estimated to be ~30 GPa along <100>, with a similar magnitude of the shear strength, which is weakest for {100} sheared along <001> as shown in FIGS. 8(b) and 8(c). These values are suggestive of a Vickers hardness near ~30 GPa—in agreement with semi-empirical model estimates between 31-39 GPa—placing the new clathrate on the cusp of known superhard materials with advanced mechanical properties similar to those of boron carbide. It is important to note that the introduction of Ca and B into the framework significantly alters the mechanical properties of the clathrate as compared with hypothetical all-carbon $C_{46}$.

The bulk modulus of the pure allotrope is calculated to be ~400 GPa and the tensile and shear strengths are both estimated to exceed 100 GPa. Nevertheless, the incorporation of boron enables the thermodynamic synthesis of the type-I framework, and the introduction of a variety of guest atoms holds potential to access a wide range of electronic properties while maintaining a robust covalent lattice.

In one embodiment of the invention, the carbon-based clathrate structures are composed of entirely $sp^3$ hybridized carbon and boron, which results in diamond-like bonding. In another embodiment of the invention, different guest atoms may be substituted within the cages to create a new class of diamond-like materials with tunable properties. Many other guest atoms and their combinations are possible within the clathrate cages.

The following is a more detailed description of the present invention with reference to working examples for prediction, synthesis of compounds and characterization of the same. The present invention is in no way limited to the following examples.

Applicants used DFT, as implemented in the Vienna Ab Initio Simulation Package (VASP) version 5.4.4, to perform geometry optimizations and electronic structure calculations with the gradient-corrected exchange and correlation functional of the Perdew-Burke-Ernzerhof (PBE) method. The core states were treated with the projector augmented wave (PAW) method with a plane-wave basis set and an energy cutoff of 500 eV. The Γ-centered k-point grids were automatically generated using the Monkhorst-Pack method in a way that the product of the lattice constants and the number of grid divisions along each reciprocal lattice vector was 30 Å for structural optimizations and 50 Å for all other calculations. Structural optimizations were performed for the ~5,000 unique structural combinations listed in TABLE 1 at both 10 and 50 GPa for a total of ~46,000 variations. Applicants used the "ISYM=2" tag to constrain symmetry during geometry optimizations in VASP. To determine if constraining symmetry impacted the optimization results, we compared the outcomes with "ISYM=2" (Symmetry Constrained) and "ISYM=0" (Symmetry Unconstrained) for several cases, and found no significant effect on the outcome. Phonon calculations within the harmonic approximation were performed using VASP coupled with the Phonopy package. For all phonon calculations, the total number of atoms in a generated supercell was always greater than 90. Using Bader's method, we analyzed electronic charge density within VASP's CHGCAR format to delineate atom-specific charges and volumes.

Stress-strain relations were calculated by estimating the stress response to structural deformation along specific loading paths using a quasistatic relaxation method. The stress response under tensile and shear strains was used to establish the ideal strengths, i.e., the lowest stress to plastically deform a perfect crystal.

Experimental Synthesis

Precursor powders were prepared by ball milling $CaB_6$ (Sigma, 99.5%), $CaC_2$ (>98%, prepared following a literature method) and glassy carbon (Sigma, 99.95%) under argon at 600 rpm for 99 one-minute cycles, targeting a bulk composition of $Ca_8B_{16}C_{30}$. The milled powder was pressed into ~50 □m □ 50 □□m □ 10 □□m pellets using 1 mm flat diamond anvils, and the pellets were loaded into diamond anvil cells (DAC) equipped with 300 □m culets and ~40 □m thick Re gaskets with ~150 □m diameter sample chambers. All sample pellets were loaded within an inert Ar glovebox with $O_2/H_2O$<1 ppm. The sample chambers were subsequently loaded and clamped with Ne at ~1 kbar, which served as thermal insulation, the pressure medium and XRD pressure calibrant.

The DAC samples were compressed to ~50 GPa and heated with a double-sided infrared laser system with in situ synchrotron X-ray diffraction at the Advanced Photon Source, Sector 13 (GSECARS) and Sector 16 (HPCAT). Diffraction data were collected using a Pilatus3 CdTe 1 M hybrid photon counting detector, which was calibrated using $LaB_6/CeO_2$ powder standards and an enstatite single-crystal standard. After high-pressure, high-temperature synthesis, powder X-ray diffraction patterns were obtained from samples during decompression to establish the PV equation of state (third-order Birch-Murnaghan) using a EoSFit. Type-I samples were measured at ambient conditions in air and did not decompose over a period of hours. Powder data were analyzed using Dioptas and GSAS/EXPGUI.

Single-Crystal XRD

A multigrain sample was recrystallized from powder at 48(2) GPa using the laser heating system at GSECARS. Prolonged heating at >3000 K led to the formation of grains large enough to obtain diffraction patterns amenable to multigrain analysis with a synchrotron beam size <5 □m □5 □m. Frames were recorded between ω=−32° to +32° in 0.5° steps with an exposure time of 5 s or 3 s per frame. Reflections were harvested using CrysAlisPRO, assigned to individual grains with DAFi, and subsequently indexed and integrated using the CrysAlisPRO software suite. Crystal structures were solved with SHELXT 2018/2 and refined using SHELXL 2019/3, invoked from within the Olex2 suite. Reflections from three individual grains were merged using SORTAV for structure refinement of type-I clathrate. SORTAV was invoked from WinGX. In the case of type-VII clathrate, diffraction data from one grain was used.

Crystal Structure Models

Table 3 contains crystal data and structure refinement parameters for type-I $Ca_8B_xC_{46-x}$ and type-VII $CaB_3C_3$. The initial crystal structure solution revealed fully occupied Ca atoms located on the 2a and 6d positions as well as clathrate framework atoms on the 6c, 16i, and 24k positions. Initially, only models with ordered framework atoms were refined (see models 1 and 2a-2c in Table 3). It was found that the pure-carbon framework model gives the best refinement indicators among the ordered models. However, Applicant's computations have shown that $Ca_8C_{46}$ is energetically and dynamically unstable. Hence, refinement of disordered arrangements of C/B atoms was attempted. It was found that the introduction of C/B disorder on the 16i leads to unphysical negative boron occupancy, while disorder on 6c does not significantly change boron occupancy from zero as shown in models 3a and 3c in TABLE 3. Only the introduction of the disorder on the 24k position (model 3b in Table 3) leads to significant improvement of refinement indicators and to a boron occupancy significantly different from zero (see TABLE 3). Introduction of B/C disorder on both 24k and 6c positions (model 3d) does not lead to improvement of refinement indicators compared with model 3b and the occupancy of B on the 6c position does not differ significantly from zero. Therefore, model 3b is preferred to model 3d. Finally, anisotropic displacement parameters for clathrate framework atoms have been refined as shown in model 4 in TABLE 3.

Figure 11:
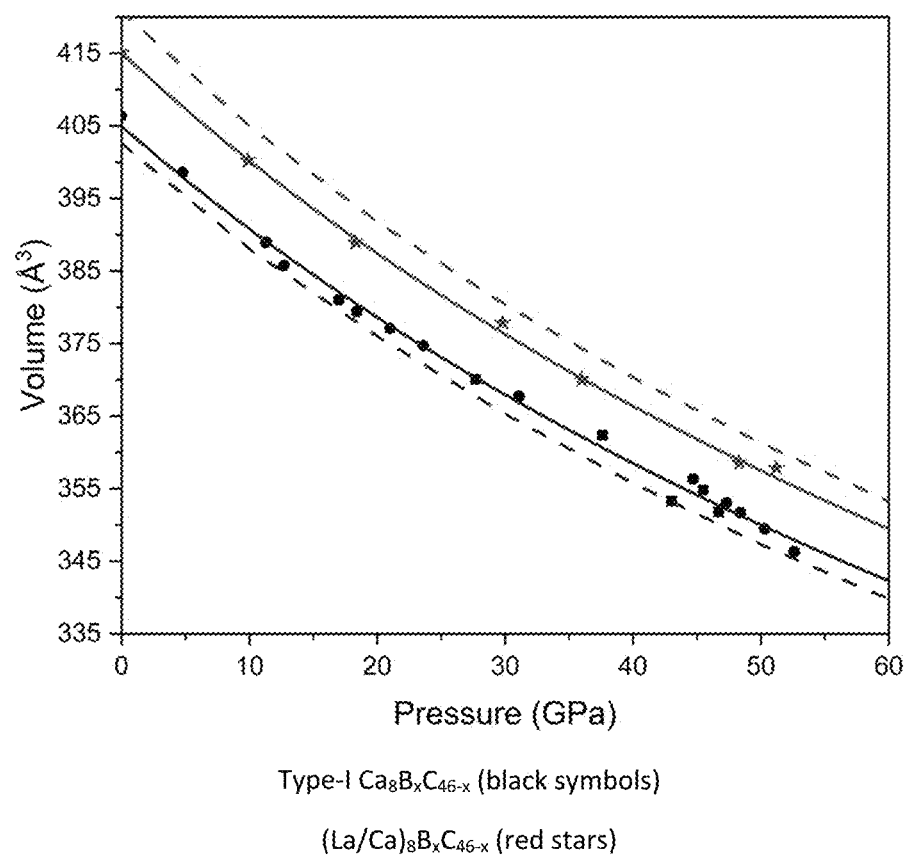
FIG. 11 shows experimental and calculated unit cell volumes as a function of pressure for type-I $Ca_8B_xC_{46-x}$ and for $(La/Ca)_8B_xC_{46-x}$.

Mixed La/Ca type-1 clathrate was produced using the experimental procedure above starting from mixed La/Ca carbide/boride precursors, targeting a bulk composition of $La_2Ca_6B_{16}C_{30}$. Structural determination as a function of pressure revealed expanded/contracted lattice parameters as compared to the single-guest $Ca_8B_xC_{46-x}$ case, indicating the incorporation of La within the clathrate cages, as shown in FIG. 11. The experimental validation of binary guest occupancy, combined with a range of favorable guest elements from DFT calculations indicates a broad range of potential guest occupancy combinations/mixtures/solid solutions.

TABLE 3

Single-crystal refinement parameters for type-I and type-VII Ca—B—C clathrates at 48(2) and 52(2) GPa, respectively.

| Empirical formula | $Ca_8B_{8.8\pm1.4}C_{37.1\pm1.4}$ | $CaB_3C_3$ |
|---|---|---|
| CSD number | 2338100 | 2338099 |
| Formula weight | 862.55 | 108.54 |
| T/K | 293(2) | 293(2) |
| Crystal system | cubic | cubic |
| Space group | Pm$\bar{3}$n | Pm$\bar{3}$n |
| a /Å | 7.0464(12) | 4.529(2) |
| V/Å³ | 349.87(18) | 92.89(14) |
| Z | 1 | 2 |
| $\rho_{calc}$/g · cm⁻³ | 4.094 | 3.881 |
| μ/mm⁻¹ | 0.299 | 0.370 |
| F(000) | 427.1 | 106 |
| Crystal size/mm³ | 0.005 × 0.005 × 0.005 | 0.005 × 0.005 × 0.005 |
| Radiation | Synchrotron (λ = 0.2952 Å) | (λ = 0.3344 Å) |
| 2Θ range for data collection/° | 3.40 to 30.2 | 5.99 to 30.0 |
| Index ranges | −11 ≤ h ≤ 10, −12 ≤ k ≤ 11, −11 ≤ l ≤ 11 | −2 ≤ h ≤ 3, −6 ≤ k ≤ 6, −6 ≤ l ≤ 6 |
| Reflections collected | 2324 | 107 |
| Independent reflections | 195 [$R_{int}$ = 0.059, $R_{sigma}$ = 0.030] | 28 [$R_{int}$ = 0.1815, $R_{sigma}$ = 0.0512] |
| Data/restraints/parameters | 195/0/16 | 28/0/3 |
| Goodness-of-fit on F² | 1.15 | 1.26 |
| Final R indexes [I >= 2σ(I)] | $R_1$ = 0.032, $wR_2$ = 0.066 | $R_1$ = 0.085, $wR_2$ = 0.221 |
| Final R indexes [all data] | $R_1$ = 0.046, $wR_2$ = 0.072 | $R_1$ = 0.096, $wR_2$ = 0.242 |
| Largest diff. peak/hole/eÅ⁻³ | +0.62/−0.53 | +1.8/−1.14 |

TABLE 4

Comparison of different structural models for type-I Ca—B—C clathrate.

| data/model | 1 | 2a | 2b | 2c | 3a |
|---|---|---|---|---|---|
| Atom positions | Ca (2a) | Ca (2a) | Ca (2a) | Ca (2a) | Ca (2a) |
| | Ca (6d) | Ca (6d) | Ca (6d) | Ca (6d) | Ca (6d) |
| | C (16i) | B (16i) | C (16i) | C (16i) | B/C (16i) |
| | C (24k) | C (24k) | B (24k) | C (24k) | C (24k) |
| | C (6c) | C (6c) | C (6c) | B (6c) | C (6c) |

TABLE 4-continued

Comparison of different structural models for type-I Ca—B—C clathrate.

| | | | | | |
|---|---|---|---|---|---|
| Reflections collected | 2324 [$R_{int}$ = 0.059, $R_{sigma}$ = 0.030] | | | | |
| Independent reflections | 195 | | | | |
| Data/restraints/parameters | 195/0/10 | | | | 195/0/11 |
| Chemical formula | $Ca_8C_{46}$ | $Ca_8B_{16}C_{30}$ | $Ca_8B_{24}C_{22}$ | $Ca_8B_6C_{40}$ | $Ca_4B_{-0.2}C_{23}$ |
| $10^3 \cdot U_{11}$ (Ca (2a))/Å$^2$ | 3.7(3) | 3.4(5) | 3.9(3) | 3.8(3) | 3.8(3) |
| $10^3 \cdot U_{11}$ (Ca (6d))/Å$^2$ | 4.0(4) | 3.6(6) | 4.0(4) | 4.0(4) | 3.9(4) |
| $10^3 \cdot U_{33}$ (Ca (6d))/Å$^2$ | 6.0(3) | 5.9(5) | 6.2(3) | 6.0(3) | 6.1(3) |
| $10^3 \cdot U_{iso}$ (C/B (16i))/Å$^2$ | 5.7(4) | 1.9(7) | 6.2(5) | 5.8(5) | 6.9(5) |
| $10^3 \cdot U_{iso}$ (C/B (24k))/Å$^2$ | 6.8(4) | 6.6(6) | 3.2(4) | 6.8(4) | 6.7(4) |
| $10^3 \cdot U_{iso}$ (C/B (6c))/Å$^2$ | 7.2(7) | 7.4(12) | 7.2(8) | 3.7(8) | 7.2(7) |
| B molar fraction* | — | — | — | — | <0 |
| Goodness-of-fit on $F^2$ | 1.12 | 1.26 | 1.19 | 1.19 | 0.843 |
| Final R indexes [I ≥ 2σ(I)] | $R_1$ = 0.035, w$R_2$ = 0.075 | $R_1$ = 0.045, w$R_2$ = 0.136 | $R_1$ = 0.037, w$R_2$ = 0.093 | $R_1$ = 0.038, w$R_2$ = 0.089 | $R_1$ = 0.036, w$R_2$ = 0.086 |
| Final R indexes [all data] | $R_1$ = 0.049, w$R_2$ = 0.082 | $R_1$ = 0.060, w$R_2$ = 0.147 | $R_1$ = 0.052, w$R_2$ = 0.103 | $R_1$ = 0.053, w$R_2$ = 0.096 | $R_1$ = 0.049, w$R_2$ = 0.098 |
| $\rho_{max}/\rho_{min}$/eÅ$^{-3}$ | +0.62/−0.65 | +1.2/−0.66 | +0.79/−0.61 | +1.2/−0.77 | +0.61/−0.68 |

| data/model | 3b | 3c | 3d | 4 |
|---|---|---|---|---|
| Atom positions | Ca (2a) | Ca (2a) | Ca (2a) | Ca (2a) |
| | Ca (6d) | Ca (6d) | Ca (6d) | Ca (6d) |
| | C (16i) | C (16i) | C (16i) | C (16i) |
| | B/C (24k) | C (24k) | B/C (24k) | B/C (24k) |
| | C (6c) | B/C (6c) | B/C (6c) | C (6c) |
| Reflections collected | 2324 [$R_{int}$ = 0.059, $R_{sigma}$ = 0.030] | | | |
| Independent reflections | 195 | | | |
| Data/restraints/parameters | 195/0/11 | 195/0/12 | | 195/0/16 |
| Chemical formula | $Ca_8B_{9.12}C_{36.88}$ | $Ca_8B_{0.78}C_{45.22}$ | $Ca_8B_{10.92}C_{35.08}$ | $Ca_8B_{8.88}C_{37.12}$ |
| $10^3 \cdot U_{11}$ (Ca (2a))/Å$^2$ | 3.9(3) | 3.7(3) | 3.9(3) | 3.8(3) |
| $10^3 \cdot U_{11}$ (Ca (6d))/Å$^2$ | 4.1(4) | 4.0(4) | 4.1(3) | 4.2(3) |
| $10^3 \cdot U_{33}$ (Ca (6d))/Å$^2$ | 6.1(2) | 6.0(3) | 6.1(2) | 6.1(2) |
| $10^3 \cdot U_{iso}$ (C/B (16i))/Å$^2$ | 5.7(4) | 5.7(4) | 5.8(4) | 5.7(4)† |
| $10^3 \cdot U_{iso}$ (C/B (24k))/Å$^2$ | 5.5(4) | 6.8(4) | 5.4(4) | 5.5(4)† |
| $10^3 \cdot U_{iso}$ (C/B (6c))/Å$^2$ | 7.2(6) | 6.7(8) | 6.4(7) | 7.6(6)† |
| B molar fraction* | 0.38(6) | 0.13(12) | 0.40(6) - 24k 0.22(11) - 6c | 0.37(6) |
| Goodness-of-fit on $F^2$ | 1.14 | 1.14 | 1.13 | 1.15 |
| Final R indexes [I ≥ 2σ(I)] | $R_1$ = 0.033, w$R_2$ = 0.069 | $R_1$ = 0.035, w$R_2$ = 0.074 | $R_1$ = 0.033, w$R_2$ = 0.069 | $R_1$ = 0.032, w$R_2$ = 0.066 |
| Final R indexes [all data] | $R_1$ = 0.047, w$R_2$ = 0.075 | $R_1$ = 0.049, w$R_2$ = 0.080 | $R_1$ = 0.047, w$R_2$ = 0.076 | $R_1$ = 0.046, w$R_2$ = 0.072 |
| $\rho_{max}/\rho_{min}$/eÅ$^{-3}$ | +0.62/−0.53 | +0.61/−0.66 | +0.61/−0.52 | +0.62/−0.53 |

*B molar fraction on the disordered site only;
†$U_{eq}$ since C and B atoms refined anisotropically

TABLE 5

Rietveld refinement parameters for type-I Ca—B—C clathrate at ambient pressure.

| Atom | Site | x | y | z | Fractn | Uiso × 100 |
|---|---|---|---|---|---|---|
| Ca1 | 2a | 0 | 0 | 0 | 1 | 1.71(6) |
| Ca2 | 6d | 0.25 | 0.5 | 0 | 1 | 1.71(6) |
| C1 | 6c | 0.5 | 0.25 | 0 | 1 | 1.1(1) |
| C2 | 16i | 0.1871(5) | 0.1871(5) | 0.1871(5) | 1 | 1.1(1) |
| C3 | 24k | 0.3058(9) | 0.1274(6) | 0 | 0.62(3)* | 1.1(1) |
| B3 | 24k | 0.3058(9) | 0.1274(6) | 0 | 0.38(3)* | 1.1(1) |

| | |
|---|---|
| Space group | $Pm\bar{3}n$ |
| a/Å | 7.4040(2) |
| Radiation | Synchrotron (λ = 0.3344 Å) |
| $R_{wp}$-Bknd | 0.022 |

*Initialized composition from high-pressure SXRD data

Figure 9A:
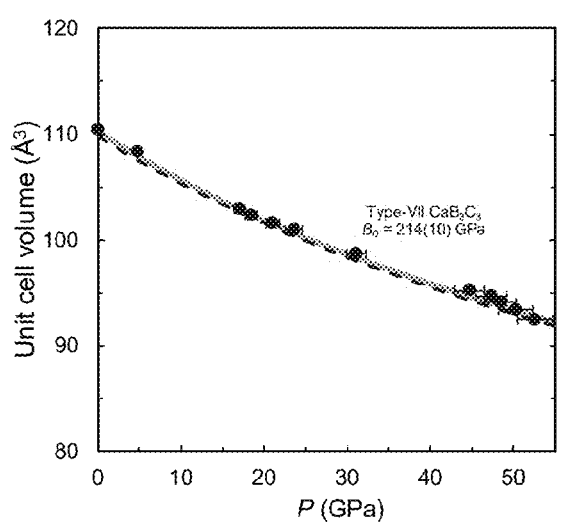
FIGS. 9(a) and 9(b) show unit-cell volume vs. pressure and bulk modulus vs. the pressure derivative for type-I $Ca_8B_xC_{46-x}$ and type-VII $CaB_3C_3$.
Figure 9B:
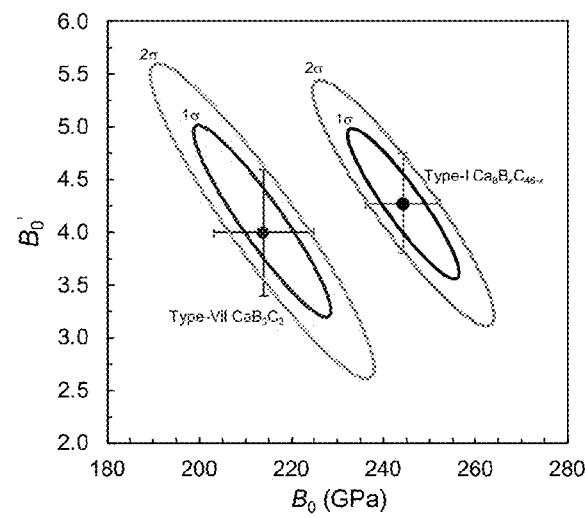

FIGS. 9(a) and 9(b) show experimental PV data for type-I $Ca_8B_xC_{46-x}$ which were modelled using a third-order Birch-Murnaghan equation of state (EOS) to obtain the zero-pressure volume, $V_0$, bulk modulus, $B_0$, and its pressure derivative, $B_0'$. Refined experimental parameters are $V_0$=405.9(3), $B_0$=244(8) and $B_0'$=4.2(4) for type-I $Ca_8B_xC_{46-x}$ and $V_0$=110.5(1), $B_0$=214(10) and $B_0'$=4.1(6) for type-VII $CaB_3C_3$, which compare favorably with DFT (PBE) calculations that yield $B_0$=256 and $B_0'$=3.8 for type-I $Ca_8B_xC_{46-x}$ and $B_0$=224 and $B_0'$=3.7 for type-VII $CaB_3C_3$. FIG. 9(a) shows the experimental unit cell volume as a function of pressure for type-I clathrate (points) and refined EOS (solid line) compared with theoretical equation of state for ordered type-I $Ca_8B_{16}C_{30}$ (dashed line). FIG. 9(b) shows the experimental uncertainty in $B_0$ and $B_0'$ as confidence ellipses drawn at one and two standard deviations for type-I $Ca_8B_xC_{46-x}$ (black) and type-VII $CaB_3C_3$ (blue).

FIG. 10 shows phonon dispersion relations for type-I $Ca_8C_{46}$ at 50 GPa with a calculated convex hull distance of >700 meV/atom at 50 GPa. As is apparent from the lower region of FIG. 10, $Ca_8C_{46}$ is dynamically unstable and yields imaginary phonon frequencies throughout the (first) Brillouin zone. As noted above (see description of FIG. 6(c)) this agrees with Applicant's prediction that boron atoms must substitute within the type-I framework for stability.

As the present invention may be embodied in several forms without departing from the spirit or essential characteristics thereof, it will be understood that the invention is not limited by the details of the foregoing description, unless otherwise specified, but rather should be construed broadly within its spirit and scope as defined in the appended claims, and therefore all changes and modifications that fall within the metes and bounds of the claims. Accordingly, the invention is defined by the appended claims wherein:

The invention claimed is:

1. A carbon-based clathrate compound of a formula $Ca_8B_xC_{46-x}$ having a clathrate lattice structure.

2. The carbon-based clathrate compound of claim 1, wherein the clathrate lattice structure comprises two small $[5^{12}]$-type (pentagonal dodecahedra) cages and six large $[5^{12}6^2]$-type (tetradecahedra) cages.

3. The carbon-based clathrate compound of claim 2, wherein the clathrate lattice structure is formed of $sp^3$ hybridized carbon and boron.

4. The carbon-based clathrate compound of claim 2 wherein the carbon-based clathrate compound is formulated to yield a bulk modulus of 244±8 GPa.

5. The carbon-based clathrate compound of claim 2 wherein the carbon-based clathrate compound is formulated to yield a hardness of 31-39 GPa.

6. The carbon-based clathrate compound of claim 1 further comprising a covalent carbon clathrate lattice in which B substitution serves to stabilize the clathrate lattice structure.

7. The carbon-based clathrate compound of claim 6, wherein Ca is a guest atom encapsulated within the clathrate lattice structure.

8. The carbon-based clathrate compound of claim 1 wherein at least one of the Ca atoms is replaced with a guest atom chosen from a group of guest atoms comprising strontium, lanthanum, and sodium.

9. The carbon-based clathrate compound of claim 8 wherein the group of guest atoms includes atoms having an atomic radius comparable to that of calcium.

10. A carbon-based clathrate compound of a formula $M_{24}B_xC_{136-x}$ having a clathrate lattice structure wherein M is a metallic element and wherein the clathrate lattice structure comprises sixteen small $[5^{12}]$-type (pentagonal dodecahedra) cages and eight large $[5^{12}6^4]$-type (hexadecahedra) cages.

11. The carbon-based clathrate compound of claim 10 wherein at least one of the Ca atoms is replaced with a guest atom chosen from a group of guest atoms comprising strontium, lanthanum, and sodium.

12. The carbon-based clathrate compound of claim 11 wherein the group of guest atoms includes atoms having an atomic radius comparable to that of calcium.

13. The carbon-based clathrate compound of claim 12 having the formula $Ca_6B_{12}C_{22}$.

14. The carbon-based clathrate compound of claim 12 having the unit cell formula $Ca_{24}B_{48}C_{88}$.

15. A carbon-based clathrate compound having a clathrate lattice structure wherein the clathrate lattice structure includes carbon, boron, and at least one guest atom, wherein the clathrate lattice structure includes boron site occupation and the guest atom is chosen from a group of elements comprising sodium, strontium, and calcium.

16. The carbon-based clathrate compound of claim 15 having the formula $Na_8B_8Ca_8$.

17. The carbon-based clathrate compound of claim 15 having the formula $Sr_8B_{16}C_{30}$.

18. The carbon-based clathrate compound of claim 15 having the formula $Ca_8B_{16}C_{30}$.

19. The carbon-based clathrate compound of claim 15 having the formula $Ca_6B_{12}C_{22}$.

20. The carbon-based clathrate compound of claim 15 having the unit cell formula $Ca_{24}B_{48}C_{88}$.

* * * * *